United States Patent [19]

Raimondi et al.

[11] 4,042,555

[45] Aug. 16, 1977

[54] BINDER COMPOSITION FOR ADHESIVES AND SEALANTS

[75] Inventors: Victor V. Raimondi, Naperville; Roy A. Fox, Bollingbrook; Casey E. Piorkowski, Orland Park, all of Ill.

[73] Assignee: Standard Oil Company (Indiana), Chicago, Ill.

[21] Appl. No.: 576,389

[22] Filed: May 12, 1975

[51] Int. Cl.$^2$ ............................................. C08L 53/02
[52] U.S. Cl. ........................ 260/29.6 RB; 260/27 BB; 260/42.43; 260/42.47; 260/876 B
[58] Field of Search .................... 260/876 B, 29.6 RB, 260/27 BB

[56] References Cited

U.S. PATENT DOCUMENTS

| 3,239,478 | 3/1966 | Harlan | 260/876 |
|---|---|---|---|
| 3,325,430 | 6/1967 | Grasley | 260/25 |
| 3,632,540 | 1/1972 | Unmuth et al. | 260/27 |
| 3,784,587 | 1/1974 | Chambers | 260/876 B |
| 3,917,607 | 11/1975 | Crossland et al. | 260/28.5 |

*Primary Examiner*—Carman J. Seccuro
*Attorney, Agent, or Firm*—Wallace L. Oliver; Arthur G. Gilkes; William T. McClain

[57] ABSTRACT

A binder composition useful in solventless, solvent based and water emulsifiable sealants and adhesives comprises poly(alpha-methylstyrene), polybutene and a polystyrene/elastomer block copolymer.

9 Claims, No Drawings

BINDER COMPOSITION FOR ADHESIVES AND SEALANTS

BACKGROUND OF THE INVENTION

This invention relates to adhesives and sealants and more specifically to an improved binder portion system incorporated therein.

Compositions useful as sealants or adhesives generally include a binder portion (sometimes called the vehicle) which provides a structural base for the sealant or adhesive. A suitable binder should have high elasticity and good cohesive strength. Depending on the end use, a binder can be used in conjunction with a tackifying resin to provide adhesion between a substrate and the binder or along with fillers to provide bulk in a sealant. Organic solvents can be added to provide a solvent release adhesive system. If the binder system is emulsified in a water-oil system, water based sealant and/or adhesives can be prepared which avoid sometimes environmentally detrimental organic solvent systems. One commerical binder system now used is based on butyl rubber, which unfortunately can lack strength, be difficult to emulsify and can biologically degrade before use. Polysulfide systems generally have satisfactory physical properties, but they are too expensive to be used in many commercial applications.

SUMMARY OF THE INVENTION

Our invention comprises a binder composition suitable for use in adhesion and sealants comprising from about 5 to 200 phr of poly(alphamethylstyrene), from about 40 to 1200 phr of butylene polymers comprising predominantly of mono-olefins, and about 100 phr of a styrene-elastomer copolymer in which an elastomer midblock comprises about 60 to 90% of the copolymer and is either isoprene, ethylene-butylene or butadiene, This composition can be used in conjunction with additional tackifiers, fillers and/or solvents to form adhesives or sealants and can be water emulsified to form water-based adhesives or sealants.

DESCRIPTION OF THE INVENTION

We have discovered a binder system usable in sealants and adhesives including water emulsified systems comprising a styrene-(isoprene or ethylene-butylene)-styrene block copolymer, poly(alpha-methylstyrene), and a mixture containing primarily polybutenes. This binder system can be used with tackifiers and with fillers such as silica or calcium carbonate to produce an architectural sealant, with solvent and filler to produce a solvent release sealant, or with tackifiers to produce a pressure-sensitive hot-melt adhesive. Additionally, this binder system can be emulsified in water and used with a filler to form a sealant or with tackifiers to form an adhesive. Adhesive and sealant compositions using the binder system of our invention generally have superior physical properties to those compositions using butyl rubber and match in at least some properties compositions using polysulfides while costing much less than polysulfides.

Suitable poly (alpha-methylstyrenes)[poly(AMS)] useful in our invention are characterized by having softening points (ASTM D36) in the range of about 200° to 300° F. and molecular weights (Mechrolab) in the ranges of about 675 to 1000. Such α-methylstryene polymers generally are soluble in the 70% level in aromatics and chlorinated solvents such as toluene, xylene, ethylene dichloride, perchloroethylene and trichloroethylene, while these resins are insoluble at the 10% level in alcohols and aliphatic hydrocarbons such as butyl alcohol, ethyl alcohol, octyl alcohol, kerosene, mineral spirits, and petroleum ether. These polymers are insoluble in ethyl acetate and acetone but soluble in butyl acetate and methyl ethyl ketone. Based on the clarity of cast film α-methylstyrene polymers are compatible at 10 to 90% levels with polystyrene, coumerone-indene resins, rosin and rosin esters, hydrocarbon resins, elastomers, styrene-butadiene copolymers, neoprene, nitrile/PVC rubber and natural rubber. Further, these polymers are compatible with ester, phosphate, chlorinated paraffin and aromatic hydrocarbon plasticizers and with aromatic and aromatic-naphthenic plasticizer oils. These resins are incompatible at 10 to 90% levels with paraffinic oil. Additional properties of selected α-methylstyrene resins are provided in Table I.

TABLE I

| Property | Test Method | poly(AMS) | | |
|---|---|---|---|---|
| | | (1) | (2) | (3) |
| Softening Point, ° F. | ASTM D36 | 210 | 245 | 286 |
| Viscosity, Gardner-Holdt (60% in Toluene) | ASTM D154 | J-L | U-V | Z-Z |
| Color | Gardner | 1 | 1 | 1 |
| Iodine No., Wijs | ASTM D555 | Nil | Nil | Nil |
| Acid No. | ASTM D664 | Nil | Nil | Nil |
| Saponification No. | ASTM D939 | Nil | Nil | Nil |
| Appearance | | Bright and Clear | | |
| Ash, % | ASTM D555 | 0.001 | 0.001 | 0.001 |
| Cloud Point, ° F. | Powers | 170 | 212 | 251 |
| Specific Gravity 60/60° F. | ASTM D1298 | 1.075 | 1.075 | 1.075 |
| Molecular Weight | Mechrolab | 685 | 790 | 960 |
| Refractive Index, 20° F. | | 1.61 | 1.61 | 1.61 |
| Flash Point, ° F. | | 410 | 435 | 475 |

(1) Amoco Resin 18-210
(2) Amoco Resin 18-240
(3) Amoco Resin 18-290

The polybutenes useful in our invention are a series of butylene polymers with viscosities ranging from about 25 centipoise at 100° F. to about 4500 at 210° F. comprising predominantly (85-98%) of mono-olefins with the balance being isoparaffins. These polymers are made by polymerizing a butene feedstock, which is rich in isobutylene, with a metal halide catalyst. Mainly, the polymer backbone resembles polyisobutylene, but can contain 1- and 2-butenes, especially in lower molecular weight material. The mono-olefins comprising the main part of these polybutenes predominantly are trisubstituted with only minor amounts of vinylidene and terminal vinyl structures. The major trisubstituted olefin component is a dimethyl olefin which can berepresented as:

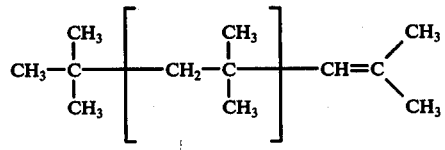

Some internal double bonds probably exist, but are difficult to characterize. These polybutenes are chemically stable, permanantly fluid liquids with moderate to high viscosity which are essentially water-white. These polymers are miscible at 20° C. with all hydrocarbon solvents, with chlorohydrocarbons such as carbontetrachloride, chloroform and trichloroethylene, with ethers such as diethylether and with esters such as n-butylacetate. They are insoluble at 20° C. with water, ethyl alcohol, isopropyl alcohol, acetone, methyl ethyl ketone and glacial acetic acid, but are partially soluble in n-butyl alcohol.

Polybutenes are compatible at the 50% level with most hydrocarbon polymers. At lower proportions, these polybutenes are compatible with most alkyds, modified alkyds, asphalts, chlorinated products, phenol condensation products and styrene copolymers. Styrene homopolymers, cellulose ester, alkyl cellulose generally are incompatible at the 10% level. The tackiness of these materials increases with increased molecular weight. These polymers can be emulsified with a variety of anionic, cationic, and nonionic surfactants and emulsifying agents, such as oleic acid, triethanolamine, Triton X-100 (Rohm & Haas), Siponic 218 (Alcolac) and Isothan DL-1 (Onyx). Further properties of these polybutenes are given in Table II.

TABLE II

| Test Method | | L-14[1] | L-50 | L-100 | H-25 | H-35 | H-50 | H-100 | H-300 | H-1500 | H-1900 |
|---|---|---|---|---|---|---|---|---|---|---|---|
| Viscosity | D-445 | | | | | | | | | | |
| CS at 100° F. | | 27-33 | 106-112 | 210-227 | 48-59 | 74-79 | 109-125 | 196-233 | 627-675 | 3026-3381 | 4069-4382 |
| CS at 210° F. | | — | — | — | — | — | — | — | — | — | — |
| Flash Point COC° F., Min. | D-92 | 280 | 300 | 310 | 325 | 330 | 330 | 380 | 440 | 470 | 470 |
| API Gravity at 60° F. | D-287 | 36-39 | 33-36 | 32-35 | 29.5-31.5 | 28-31 | 27-30 | 26-29 | 25-28 | 24-27 | 23-26 |
| Color | APHA | 70 | 70 | 70 | 70 | 70 | 70 | 70 | 70 | 70 | 70 |
| Haze Free, Max. | | 15 | 15 | 15 | 15 | 15 | 15 | 15 | 15 | 15 | 15 |
| Haze, Max. | | | | | | | | | | | |
| Appearance | Visual | No Foreign Material Pass | No Foreign Material Pass | No Foreign Material Pass | No Foreign Material Pass | No Foreign Material Pass | No Foreign Material Pass | No Foreign Material Pass | No Foreign Material Pass | No Foreign Material Pass | No Foreign Material Pass |
| Odor | Mechrolab | Bright and clear; free from suspended matter | | | | | | | | | |
| Av. Mol. Weight | Osmometer | 320 | 420 | 460 | 610 | 660 | 750 | 920 | 1290 | 2060 | 2300 |
| Viscosity Index | ASTM D567 | 69 | 90 | 95 | 97 | 100 | 104 | 109 | 117 | 122 | 122 |
| Fire Point COC, ° F. | ASTM D92 | 310 | 325 | 330 | 340 | 365 | 380 | 450 | 525 | 585 | 585 |
| Pour Point, ° F. | ASTM D97 | −60 | −40 | −30 | −15 | +5 | +5 | +20 | +35 | +65 | +65 |
| Sp. Grav. 60/60° F | — | 0.8373 | 0.8509 | 0.8571 | 0.8633 | 0.8729 | 0.8816 | 0.8899 | 0.8984 | 0.9042 | 0.9065 |
| Density, lb/gal | — | 6.97 | 7.08 | 7.14 | 7.19 | 7.27 | 7.34 | 7.41 | 7.48 | 7.53 | 7.55 |
| Ref. Index, $N_D$D | ASTM D1218 | 1.4680 | 1.4758 | 1.4780 | 1.4849 | 1.4872 | 1.4901 | 1.4941 | 1.4970 | 1.5022 | 1.5042 |
| Acidity, mg KOH/gm | ASTM D974 | 0.03 | 0.02 | 0.02 | 0.01 | 0.04 | 0.04 | 0.01 | 0.01 | 0.01 | 0.01 |
| Total sulfur, ppm, | X-Ray | 15 | 12 | 11 | 7 | <5 | <5 | <5 | <5 | <5 | <5 |
| Appearance Evaporation Loss 10 hrs at 210° F (wt%) | ASTM D972 | 8.8 | 6.1 | 5.6 | 5.1 | 3 | 1.5 | 1.45 | 1 | 0.32 | 0.25 |

[1]AMOCO Polybutenes

The styrene-rubber-styrene block copolymers useful in our compositions comprise polystyrene end blocks chemically bound to an elastomeric mid block. Depending on the end use, the elastomeric mid-block can be either poly(isoprene) or poly(ethylene-butylene). Since polystyrene generally is incompatible with these elastomers, the polystyrene end blocks tend to agglomerate and to form a separate domain. However, these domains are limited in mobility by being chemically fastened to the elastomer such that the polystyrene domains are a discrete phase within an elastomeric continuous phase. Typically, the polystyrene portion has an average molecular weight of 2000 to 100,000 and a glass transition temperature above 25° C. while the elastomeric portion has an average molecular weight of 25,000 to 1,000,000 and a glass transition temperature below 10° C. Useful polymers where the midblock is isoprene are described in U.S. Pat. No. 3,265,765 incorporated herein by reference. Particularly useful polymers containing ethylene-butylene rubber generally have Brookfield solution viscosities of about 360 centipoise measured at 25° C. in cyclohexane and glass transition temperature of about −55° C. for the ethylene-butylene portion and about 95° C. for the polystyrene portion. Typically, the precentage of rubber in the block copolymer is from about 60% to about 90%. Representative polystyrene/elastomer copolymers are marketed under the Kraton name by Shell Chemicals Company. Kraton 1107 is a polystyrene/isoprene block copolymer with an approximate intrinsic viscosity of 1.13 and which contains about 86% isoprene. Kraton 1650 is a polybutadiene/ethylene-butylene block copolymer which contains about 64% elastomer and a Brookfield viscosity at 15% solids in cyclohexane of 360 centipoise at 25° C. Kraton 1652 is a similar polybutadiene/ethylene-butylene block copolymer, but with a lower molecular weight elastomer portion. These copolymer systems are described in J. Polymer Sci. Part C, No. 26, pp. 37–57 (1969) incorporated herein by reference.

Other block copolymers are the so-called teleblock copolymers which consist of about four blocks elastomer extending from a central source each capped with a block of poystyrene. Total molecular weights for these polymers can range from about 100,000 to 400,000 and preferably about 250,000 to 300,000. The percentage of rubber ranges from about 60% to about 80%. The rubber component for teleblock copolymers can be either isoprene, butadiene, or ethylene-butylene rubber.

Our three-component binder system combines three separate components to form a composition with entirely different properties from any of its substitutents. Typical polystyrene-rubber block copolymers, such as Shell's Kraton 1107, Kraton 1650, or Kraton 1652, cannot be used alone in the various applications required of a widely used binder system. The addition of poly(AMS) strengthens the polystyrene domains while the polybutene component associates with the elastomeric mid-block portion and aids in the processibility of the system whie providing an inexpensive extender. While Kraton itself has no tack, the three-component system has tack although additional tackifying agents are needed for adhesive applications. Although polybutenes and poly(AMS) are incompatible, the combination of these and a polystyrene-elastomer block copolymer forms a completely compatible system. Further, in the important water emulsifiable systems both poly(AMS) and the block copolymer are difficult to emulsify and have poor emulsion stability, while the three-component combination can be emulsified and has excellent stability. By comparison, a butyl binder is difficult to emulsify and will biologically degrade in water.

Suitable tackifiers are resins which provide adhesion between a substrate and a binder. In combination with a binder, the tackifier provides good rolling ball tack and agressive tack to the total system. Typically, a tackifying resin combines physically, e.g., through van der Waals forces or hydrogen bonds, with a region of a binder, while providing substrate adhesion. Usually, different tackifying resins are needed to combine effectively with the two phases of a polystyrene/elastomer block copolymer.

The advantageous proportions of the three components differ somewhat in the various applications. Generally in our compositions for each 100 parts per hundred of resin (phr) of block copolymer there can be about 40 to 1200 phr of polybutenes and about 5 to 200 phr of poly(AMS). In addition to the basic three-component binder system, other components can be included in effective amounts depending on the ultimate use, such as tackifiers, fillers, solvents, anti-oxidants, U.V. inhibitors, driers, pigments and surfactants.

In solvent-based sealants for every 100 phr of block copolymer there should be 200 to 1200 phr and preferably about 400 phr of polybutene and about 5 to 200 phr and preferably about 80 to 90 phr of poly(AMS). In gunnable hot melt sealants for every 100 phr of block copolymer, there should be about 600 to 1000 phr of polybutene and about 40 to 300 phr and preferably about 100 phr of poly(AMS). In these systems, if a block copolymer with a lower molecular weight mid-block is used, the polybutene level can be decreased to about 300 to 400 phr. In water for every 100 phr of block copolymer there can be from about 20 to 80 phr and preferably about 40 phr of poly(AMS) and about 40 to 400 phr, preferably 40 to 200 phr and most advantageously about 80 to 90 phr of polybutene using polystyrene/isoprene block copolymer, and about 100–900 phr, preferably 400 to 600 phr and most preferably about 500 phr of polybutene using polystyrene/ethylene-butylene block copolymer. Hot-melt adhesives generally contain three-component binder systems similar to the water emulsifiable systems.

Compositions of our invention are demonstrated, but not limited, by the following examples.

The first set of examples deal with compositions of our invention useful in hot-applied solventless architectural sealants. The preferred binder system for such uses comprises poly(AMS), polybutene, and a polystyrene ethylene-butylene rubber block copolymer. The sealants produced from such binder systems are hot applied in semisolid form, polymeric-based materials which exhibit good adhesion. Such material is used in glazing windows of high-rise buildings which are characterized by low stress-strain behavior. The main purpose of such sealants is to seal out dirt, water, and air from a building's interior. A series of formulations were compounded using a sigma blade mixer with a jacket temperature of 300° F. although temperatures between 230° and 300° F. can be used. The use of poly(alpha-methylstyrene) lowers the melt viscosity of the polymer composition and thus allows shorter mixing times. Effective amounts of tackifiers and fillers are used, generally in the range of 50 to 700 phr of tackifiers and in a broad range of about 600 to 1600 phr and preferably about 1300 to 1400 phr of fillers. A suitable formulation for a hot-melt sealant is shown in Table III. Properties of this formulation are shown in Table IV. Other representative sealant formulations are shown in Table V.

TABLE III

Example 1

| Formulation | phr |
|---|---|
| Block copolymer[1] | 100 |
| Poly(AMS)[2] | 250 |
| Polybutene[3] | 650 |
| Atomite CaCO$_3$[4] | 1100 |
| Pexalyn A-072[5] | 200 |
| Hi Sil 233[6] | 250 |
| TiO$_2$ | 50 |
| Irganox 1010[7] | 1 |
| Cyasorb UV 531[8] | 1 |

Mix Procedure

| Time, Minutes | |
|---|---|
| 0 | Add Amoco H-1500, Irganox 1010, Cyasorb UV 531, CaCO$_3$, Hi Sil and TiO$_2$. Steam on to 300° F. |
| 5 | Add Kraton 1650 |
| 15 | Add Resin 18-290 |
| 20 | Add Pexalyn A-072 |
| 35 | Dump |

Extrusion Parameters

| | |
|---|---|
| Hardman PSA-II | |
| Barrel Temperature | 300° F |
| RPM | 168 |
| Dies Used | ⅛ inch × ⅛ inch<br>⅜ inch by ⅜ inch |

[1]Kraton GX-1650 (Shell Chemical Co.)
[2]AMOCO Resin 18-290
[3]AMOCO Polybutene H-1500
[4]filler (Thompson-Weinman & Co.)
[5]midblock tackifier (Hercules)
[6]precipitated silica filler (PPG, Inc.)
[7]antioxidant (Geigy Industrial Chemicals)
[8]U.V. inhibitor (American Cyanamid)

TABLE IV

| Formulation | Example 1 | Requirement |
|---|---|---|
| NAAMM SS-1B-68 Non-Skinning, Resilient, Preformed Compounds | | |
| Solids, % | 100 | 98% Min. |
| Adhesion | | |
| Initial | pass | No loss of adhesion |
| Shear, psi | 29.50 | 15 psi min. |
| Compression Set, % | | |
| RT | 3.70 | 25% max. |
| 158° F. | 90.00 | 50% max. |
| Accelerated Aging, Shore A | 35 | 5–30 |
| Accelerated Weathering, Shore A | 45 | 5–30 |
| Low Temperature Flex | pass | No cracking or loss of adhesion |
| Resistance to Corrosion | pass | No corrosion greater than ⅛ inch from bondline |
| AAMA 804.1, Ductile Back Bedding Glazing Tapes | | |
| Visual | pass | No surface cracks, bond loss, staining, or vehicle bleed |
| Hardness, Shore A | | <55 |
| Normal | 40 | |
| 21 days at 140° F. | 41 | |
| 21 days of U.V. | 46 | |
| Peel Adhesion, lbs./inch | | 4.0 lbs./in. min. |
| R. T. - Aluminum | 4.4(100%) | (90.0% cohesive failure minimum) |
| R. T. - Glass | 4.5(100%) | |
| Aged - 21 days at 140° F | | |
| Aluminum | 4.6(100%) | |
| Glass | 4.3(100%) | |
| Sag | pass | <¼ inch |
| Stain | pass | No migratory stain |
| Water Resistance | pass | No breakdown of compound |

TABLE V

| | Examples[1] | | | | | | |
|---|---|---|---|---|---|---|---|
| | 2 | 3 | 4 | 5 | 6 | 7 | 8 |
| Kraton 1650 | 100[2] | 100 | 100 | 100 | 100 | 100 | 100 |
| Mid-Block Tackifier[3] | 200 | 200 | 200 | 200 | 200 | 200 | 200 |
| End-Block Tackifier[4] | 100 | 200 | 200 | 200 | 200 | 200 | 200 |
| Amoco H-100 | 600 | — | — | — | — | — | — |
| Amoco H-300 | — | 800 | — | 1000 | — | 900 | — |
| Amoco H-1500 | — | — | 800 | — | 1000 | — | 900 |
| Amoco R-18-240 | 100 | 100 | 100 | 100 | 100 | 100 | 100 |
| CaCO$_3$ | 800 | 1000 | 1000 | 1200 | 1200 | 1100 | 1100 |
| Silica | 300 | 200 | 200 | 200 | 200 | 200 | 200 |
| Antioxidant | 1 | 1 | 1 | 1 | 1 | 1 | 1 |
| UV Stabilizer | 1 | 1 | 1 | 1 | 1 | 1 | 1 |
| TiO$_2$ | 20 | 20 | 20 | 20 | 20 | 20 | 20 |

Mix Procedure

| Time, Min. | |
|---|---|
| 0 | Add end-block tackifier, 50% of filler wt. of polybutene, antioxidant, UV stabilizer, fillers and pigment. |
| 5 | Add Kraton 1650 |
| 15 | Add Resin 18 |
| 25 | Add mid-block tackifier |
| 35 | Add remaining polybutene |
| 45 | Dump |

[1]These compositions were prepared in a sigma blade mixer, using a jacket temperature of 260–280° F.
[2]parts by weight.
[3]Super Beckacite 2000 (Rheichhold)
[4]Staybelite #3 (Hercules)

The compositions of our invention can be employed in pressure-sensitive adhesive systems useful in self-stick floor tile, specialty tapes and labels and in situations where solvent-free coating provides economic or environmental advantages. The thermoplastic elastomer useful in these formulations is a block copolymer of styrene and isoprene. The central isoprene portion provides the elastomeric characteristics while the polystyrene end groups associate into domains that provide the effect of vulcanization. The isoprene block has negligible tack, but when polybutene is added, it associates with the isoprene and contributes to the tack and quick sticking properties necessary for adhesive applications. Generally, an effective amount of about 40 to 200 phr and preferably about 100 phr of suitable tackifiers are used. A series of formulations were compounded and evaluated as shown in Table VI. The experimental films produced were evaluated using three methods recommended by the Pressure Sensitive Tape Council (PSTC) and one method developed elsewhere.

Similarly, a solvent release adhesive can be made by preparing the same formulation, but with about 40 to 80% of a suitable solvent such as toluene, xylenes, cyclohexane or toluene/hexane.

Rolling Ball Track (PSTC-6) is a measure of the aggressive tack of a tape. The tape sample is placed at the bottom of a grooved inclined plane. A standard stainless steel ball is rolled down the incline and the distance it travels across the tape is measured. Lower values indicate greater tackiness.

Peel Adhesion (PSTC-1) measures the force required to smoothly peel back at 180° a 1 inch wide strip of tape adhered to a standard stainless steel panel.

Quick Stick (PSTC-5) measures the force required to smoothly peel off at 90° a 1 inch wide strip of tape that has been lightly placed on a standard stainless steel panel. As no pressure other than the weight of the tape is used to adhere the tape, this test is a measure of quick sticking properties.

Shear Adhesion was determined using two ½ inch wide tapes. The tapes were bonded mass coat to mass coat with ¼ inch overlap. The assembly was suspended vertically and a 5 pound weight attached to the lower piece. The time required for complete separation was recorded.

TABLE VI

| Materials | Examples | | | |
|---|---|---|---|---|
| | 9 | 10 | 11 | 12 |
| Kraton 1107[2] | 100[1] | 100 | 100 | 100 |
| Tackifier[3] | 100 | 100 | 100 | 100 |
| AMOCO Resin 18-290 | 40 | 80 | 40 | 40 |
| AMOCO Polybutene H-1500 | 20 | 40 | 10 | — |
| AMOCO Polybutene L-14 | — | — | — | 60 |
| Antioxidants[4] | 5 | 5 | 5 | 5 |
| Properties | | | | |
| Rolling Ball Tack, PSTC-6 | — | — | — | 2.8 cm |
| Quick Stick, PSTC-5 | 1.4 lbs. | 2.3 lbs. | 0.0 lbs. | 1.3 lbs. |
| Peel Adhesion, PSTC-1 | 4.7 lbs. | 3.9 lbs. | 3.4 lbs. | 2.5 lbs. |
| Shear adhesion | 1320 secs. | 85 secs. | 2700 secs. | 18 secs. |

[1] parts by weight
[2] Kraton 1107, Shell Chemical Co.
[3] Wingtack 95 (Goodyear Tire & Rubber Co.), a isobutylene-diolefin copolymer
[4] 50% Antioxidant 330, Ethyl Corp.; 50% DLTDP, American Cyanamid Co.

Composition of our invention can be used in solvent release sealant systems. Such systems are viscous solids which are placed into building joints by hand or by pressure operated guns. These sealants "cure" set through solvent loss, leaving a tough, rubbery sealant composition. Suitable slvents are aromatic liquids, preferably toluene and xylenes. Such a sealant fills stable joints and joints which move such that they may be stressed in tension, compression, transverse or longitudinal shear or combinations thereof. Such joints are characterized by discontinuities in structure by windows or other opening and suitable sealants must seal out dirt, water and air under stresses of up to 25%. Typically about 150 to 250 phr and preferably about 200 phr of a suitable solvent is used along with effective amounts of tackifiers and fillers in the approximate range 50 to 300 phr preferably about 175 phr and 450 to 1200 preferably about 750 phr, respectively.

A series of sealant solvent-release formulations were prepared incorporating the three-component composition of our invention. The sealants were prepared in a low shear ¾ gallon sigma blade mixer at a jacket temperature of about 275° F. A polystyrene/ethylene butylene block copolymer was added to a mixture of filler and pigment and allowed to process for 20 minutes. The other ingredients including solvent then were added incrementally. An advantage to this system is its ability to be processed in a low shear mixer. Up to 400 phr of polybutene can be added initially with higher levels causing formation of agglomerates. The poly(AMS) lowered the melt viscosity and thus reduced processing time, while acting as a reinforcer, flow inhibitor, and heat distortion temperature increaser. The formulations and evaluations are shown in Table VII and VIII.

Examples of our solvent release sealant systems were tested in accordance with Federal Specification TT-S-00230, *Sealing Compound: Elastomeric Type, Single Component,* Type II — Non-Sag, Class B — 25 percent total joint movement. Example 13 was found to have acceptable physical performance in the areas of Rheological properties (Type II vertical flow and horizontal flow), Extrusion rate, Hardness (Shore A-2), Weight loss, Tack Free Time, Stain and Color Change, Adhesion in Peel, and Adhesion in Peel after U.V. The data are presented in Table VIII.

TABLE VII

| Formulation | Examples | | | | |
|---|---|---|---|---|---|
| | 13 | 14 | 15 | 16 | 17 |
| Kraton 1650 | 4.40[1] | 5.00 | 6.00 | 7.00 | 8.00 |
| Amoco Resin 18-290 | 4.40 | 4.40 | 4.40 | 4.40 | 4.40 |
| Amoco H-1500 | 22.00 | 22.00 | 22.00 | 22.00 | 22.00 |
| Pexalyn A-072 | 8.80 | 8.80 | 8.80 | 8.80 | 8.80 |
| Keltrol 1001[2] | 8.80 | 7.50 | 6.50 | 5.50 | 4.50 |
| Tall Oil Fatty Acid | 0.44 | 0.44 | 0.44 | 0.44 | 0.44 |
| Irganox 1010 | 0.04 | 0.05 | 0.05 | 0.05 | 0.05 |
| Cyasorb UV-531 | 0.04 | 0.05 | 0.05 | 0.05 | 0.05 |
| Atomite CaCO₃ | 33.36 | 33.34 | 33.34 | 33.34 | 33.34 |
| HiSil 233 | 6.60 | 6.60 | 6.60 | 6.60 | 6.60 |
| TiO$_2$ | 2.20 | 2.20 | 2.20 | 2.20 | 2.20 |
| Toluene | 8.80 | 9.50 | 9.50 | 9.50 | 9.50 |
| Cobalt Drier, 6% | 0.08 | 0.08 | 0.08 | 0.08 | 0.08 |
| Manganese Drier, 6% | 0.04 | 0.04 | 0.04 | 0.04 | 0.04 |
| | 100.00 | 100.00 | 100.00 | 100.00 | 100.00 |

| Mix Procedure Time, Minutes | |
|---|---|
| 0 | Add 80% of H-1500, all CaCO₃ HiSil 233, Irganox 1010, UV-531, fatty acid, Steam on to 300° F. |
| 1 | Add Kraton GX-1650 |
| 15 | Add Resin 18-290 |
| 20 | Add Pexalyn A-072 |
| 30 | Add remaining H-1500 |
| 35 | Cold water on |
| 40 | All Keltrol 1001 |
| 50 | Incrementally add toluene and driers |
| 65 | Dump |

[1] weight percent
[2] vegetable oil/vinyl toluene copolymer drying oil

TABLE VIII

| Formulation | Example | | | | | Requirements |
|---|---|---|---|---|---|---|
| | 13 | 14 | 15 | 16 | 17 | |
| Flow, inches | | | | | | |
| Vertical | 1/16 | 1/8 | 1/16 | 0 | 0 | <3/16 inch |
| Horizontal | Pass | Pass | Pass | Pass | Pass | No deformation |
| Extrusion Rate, sec. | 27.5 | 15 | 30 | 180 | >420 | <45 sec. |
| Hardness, Shore A | 18 | 16 | 18 | 20 | 70 | 15 – 50 |
| Weight Loss | 8.172 | 9.06 | 8.84 | 7.16 | — | <10% |
| Tack-free Time | Pass | Pass | Pass | Pass | Pass | No adhesion to polyethylene |
| Stain | Pass | Pass | Pass | Pass | — | No visible stain |
| Color Change | White to Yellow Brown | Slight Yellow Brown | Slight Yellow | None | — | Must be acceptable to manufacturer |
| Adhesion in Peel, lbs/inch, (% cohesive fail) | | | | | | |
| Glass | 6.44 (100%) | 5.50 (95) | 5.30 (50) | 2.40 (0) | — | >5.0 lbs/inch |
| Aluminum | 5.57 (95%) | 5.05 (80) | 6.35 (80) | 5.50 (0) | — | 75% cohesive |
| Mortar | 7.06 (100%) | 5.55 (100) | 6.20 (60) | 2.80 (0) | — | Fail min. |
| U.V. Adhesion in Peel, lbs/inch (% cohesive fail) | | | | | | |
| Glass | 8.52 | 6.70 | 9.75 | 2.20 | — | >5.0 lbs/inch |

TABLE VIII-continued

| 75% min) | (100%) | (90) | (50) | (o) | |
|---|---|---|---|---|---|
| Bond-Durability, sq. inches 60° Bend | | | | | No greater |
| Glass | Pass | Pass | Pass | Pass | — than 1.5 sq. inches |
| Aluminum | Pass | Pass | Pass | Pass | — loss on |
| Mortar | Pass | Pass | Pass | Pass | — 3 substrates |
| RT Extension-Compression (# Cycles for adhesive failure) | | | | | |
| Glass | Fail (8) | Pass | Pass | Fail (1) | — |
| Aluminum | fail, (8) | Pass | Pass | Fail (1) | — |
| Mortar | Fail, (8) | Fail (10) | Fail (10) | Fail (3) | — |
| −15° F. Extension | | | | | |
| Glass | — | Fail (2) | Fail (2) | — | — |
| Aluminum | — | Fail (2) | Fail (2) | — | — |
| Mortar | — | — | — | — | — |

It should be noted that testing of adhesion peel specimens was carried out using a Upaco 750-601 substrate primer. Use of a primer is acceptable in testing against TTS-00230 and should not be considered detrimental to the performance of the sealant system.

Initially durability testing of the sealant indicated that the system could be extended 12.5% from its original cross section at −10° F with no apparent adhesive or cohesive failures. After appropriate conditioning, the samples were hand flexed twice about 60° to check bond and cohesion. Based on these results, it was felt that Example 13 should produce a suitable commercial sealant. Examples 14 and 15 show even better properties in extension-compression test.

The sealant showed no failure of adhesive bond or cohesive cracking after flex testing. This test generally is a fair indication of the sealant's durability potential. The samples were then compressed from their original ½-inch width to 7/16 inch and conditioned 7 days at 158° F.

After additional appropriate conditioning, the specimens were allowed to cool to standard temperature and placed in an Aymar Extension - Compression Cycler, where the samples were cmpressed from ½-inch, width to 7/16 inch, followed by extension to 9/16 inch and them compressed to ½ inch for 10 cycles. During this cyclic testing, extensive cohesive ripping was noted (8 cycles) and samples were considered to have failed. It is felt that this behavior is possibly due to the thermoplastic nature of the compound, in that conditioning in a compressed state at 158° F allowed for realignment of the polymer chain network to a cross section of 7/16 inch. As a result, upon initial extension the specimens were theoretically being extended 25% (instead of 12½%), which is considered to be beyond the limits of adhesive and cohesive stress that can be applied to these systems.

Unlike many other binder systems, our three-component binder system can be water emulsified and used in water based adhesives and sealants. Generally, a water based adhesive system can be formed by blending an water-in-oil emulsified three-component binder system and effective amount in the approximate range 40 to 200 phr of an emulsified tackifier resin. The polystyrene-rubber block copolymer used in the three-component system can include either isoprene or ethylene-butylene rubber We have found further that a water-emulsifiable sealant system can be prepared by adding effective amounts of a suitable filler such as calcium carbonate or precipitated silica to an emulsified, tackified three-component binder. Generally about 50 to 60% of filler can be used. An effective emulsified system can have up to about 50% water and typically about 20 to 30% water.

A number of different emulsifying techniques can be used to incorporate a polystyrene elastomer block copolymer, polybutene and poly(AMS) into a water compatible adhesive system. A general procedure for emulsifying the three basic components is to add the total amount of solvent to be used to the poly(AMS) and heat gently to about 230° F. and stir slowly until all the poly(AMS) is dissolved. To this is added polybutene heated to about 230° F. and the resulting blend is added to the rubbery copolymer which is then placed in an oven for 15 minutes at 210° F. after which time the blends is placed in a pebble mill roller for 1 to 2 hours. After the mixture is homogeneous, it is placed in a heating mantle at 180° F. and blended emulsions and antioxidants heated to 180° F. are added and stirred at 2000 rpm. Boiling distilled water is added to this mixture very slowly until inversion occurs, after which the remaining water can be added more rapidly.

Another effective emulsifying technique is to dissolve the polybutene in a solvent such as toluene or benzene and then add heated poly(AMS) and then crumbled rubbery copolymer. While this mixture is heated and stirred, emulsifying agents are added. Heated water then can be added and the entire stirred rapidly while heating at about 190° F. to form a stable emulsion.

Typical emulsifiable tackified systems are shown in Table IX. In tackified emulsions, it was found that by dissolving tackifier resin in a suitable solvent at about 70 to 80% NVM at 50° C. or less made possible the direct addition of the three-component binder system without excess foaming.

Physical testing of the water compatible adhesive systems were performed on 3 mil drawdowns on mylar and fabric substrates. The adhesive testing consisted of rolling ball tack, 180° peel adhesion, and quick stick properties as defined by PSTC testing methods. The results are shown in Table X.

Examples of a hot melt adhesive using a teleblock copolymer are shown in Table XI.

In summary we have found that a binder system comprising poly(alpha-methylstyrene), polybutene and a polystyrene-elastomer block copolymer can be utilized economically in a variety of different applications such as in solventless architecural sealants, solvent release sealants and adhesives, gunnable hot-melt sealants and adhesives and especially water-emulsifiable adhesives and sealants.

TABLE IX

| | Examples | | | | | | | | | | | | | |
|---|---|---|---|---|---|---|---|---|---|---|---|---|---|---|
| | 18 | 19 | 20 | 21 | 22 | 23 | 24 | 25 | 26 | 27 | 28 | 29 | 30 | 31 |
| Amoco Resin-18-210 | 10.5 | 10.5 | 12.1 | 10.5 | 6.9 | 8.3 | 8.3 | 10.2 | 7.8 | 7.5 | 6.7 | 6.7 | 7.9 | 7.9 |
| Kraton 1107 | 26.3 | 26.3 | 30.4 | 26.3 | 17.2 | 20.8 | 20.8 | 25.6 | 19.4 | 18.7 | 16.8 | 16.8 | 19.8 | 19.8 |
| Polybutene L-14 | — | — | — | — | — | — | — | 19.2 | 14.5 | 16.8 | — | — | — | — |
| Polybutene L-100 | 10.5 | 10.5 | 12.1 | — | 6.9 | 8.3 | — | — | — | — | 6.7 | 6.7 | 7.9 | — |
| Polybutene H-100 | — | — | — | 10.5 | — | — | 8.3 | — | — | — | — | — | — | 7.9 |
| Xylene | 26.3 | 26.3 | 15.2 | 26.3 | — | — | — | — | — | — | — | — | — | — |
| Fatty 20.8 | 20.8 | 19.2 | 14.5 | — | 16.8 | 16.8 | 19.8 | 19.8 | — | — | — | — | — | — |
| BRIJ 98 (1) | 0.5 | 0.5 | 0.6 | 0.5 | — | 0.4 | 0.4 | 0.5 | 0.4 | 0.4 | 0.3 | 0.3 | 0.4 | 0.4 |
| TWEEN 80 (1) | 1.0 | 1.0 | 1.2 | 1.0 | — | 0.8 | 0.8 | 1.0 | 0.8 | 0.7 | 0.6 | 0.6 | 0.8 | 0.8 |
| Triton X100 (1) | 0.5 | 0.5 | 0.6 | 0.5 | — | 0.4 | 0.4 | 0.7 | 0.5 | 0.6 | 0.3 | 0.3 | 0.4 | 0.4 |
| Distilled H$_2$O | 23.7 | 23.7 | 27.3 | 23.7 | 11.8 | 18.7 | 18.7 | 23.1 | 17.4 | 16.8 | 27.7 | 27.7 | 17.8 | 17.8 |
| Antioxidents | 0.5 | 0.3 | 0.3 | 0.3 | 0.3 | 0.2 | 0.2 | 0.25 | 0.2 | 0.2 | 0.3 | 0.3 | 0.4 | 0.4 |
| Wingtack 95 | — | — | — | — | — | 15.6 | — | — | 19.4 | 18.7 | 16.8 | — | 19.8 | 19.8 |
| Excorez 1304 (2) | — | — | — | — | 15.8 | — | 15.6 | — | — | — | — | 16.8 | — | — |
| Hexane | — | — | — | — | 5.3 | 5.2 | 5.2 | — | 4.8 | — | 4.2 | 4.2 | 4.9 | 4.9 |
| Oleic Acid | — | — | — | — | 1.3 | — | — | — | — | — | — | — | — | — |
| Fatty Acid | — | — | — | — | — | — | — | — | — | — | 2.1 | 2.1 | — | — |
| 2-Amino-2-Methyl 1-Propanol | — | — | — | — | — | — | — | — | — | — | 0.6 | 0.6 | — | — |
| Potassium Hydroxide | — | — | — | — | 0.3 | — | — | — | — | — | — | — | — | — |
| Mineral Spirits | — | — | — | — | — | — | — | — | — | 5.6 | — | — | — | — |
| Cyclohexane | — | — | — | — | — | — | — | — | — | 14.0 | — | — | — | — |

(1) emulsifiers
(2) tackifier (Exxon)

TABLE X

| | Examples | | | | |
|---|---|---|---|---|---|
| | 23 | 24 | 26 | 30 | 31 |
| Shelf-life stability in days | 60+ | 60+ | 60+ | 60+ | 60+ |
| Dilutions of 10% water stability in days | 10+ | 10+ | 10+ | 5 | 5 |
| Dilutions of 25% water stability in days | 5 | 5 | 1 | 1 | 1 |
| Freeze-thaw cycles- 8 hours at 10°F, 16 hours at R.T. cycles passed | 10 | 10 | 10 | 10 | 10 |
| Rolling ball test, cm (Mylar) | 12.5 | 21.0 | 6.0 | 30+ | 30+ |
| Rolling ball test, cm (fabric) | 14.5 | 30+ | 25.0 | 30+ | 30+ |
| 180° Peel test, lbs/inch width (fabric) | 3.5 | 2.25 | 8.75 | 2.50 | 0.5 |
| Quick stick test, lbs/inch width (fabric) | 4.5 | 3.5 | 5.5 | 1.75 | 0 |

TABLE XI

| | 32 | 33 | 34 | 35 | 36 | 37 |
|---|---|---|---|---|---|---|
| Solprene 414[2] | 100[1] | 100 | 100 | 100 | 100 | 100 |
| Foral 85[3] | 200 | 200 | 200 | 200 | 200 | 200 |
| Amoco Resin 18-210 | 40 | 40 | 40 | 40 | 40 | 40 |
| Amoco Polybutene L-14 | 20 | 40 | 60 | — | — | — |
| Amoco Polybutene L-100 | — | — | — | 20 | 40 | 60 |
| Irganox 1010 | 1 | 1 | 1 | 1 | 1 | 1 |
| Properties | | | | | | |
| Lap Shear (Sec.) | 1536 | 486 | 83 | 1878 | 35 | 9.0 |
| 180° Peel Adhesion lbs/inch | 3.5 | 7.6 | 6.2 | 4.2 | 6.1 | 5.8 |
| Aging Test | | | | | | |
| Lap Shear 2 weeks | 1803 | 471 | 79 | 1902 | 50 | 15 |
| 4 weeks | 1827 | 491 | 80 | 1850 | 35 | 14 |
| 180° Peel Adhesion 2 weeks | 3.6 | 6.6 | 4.7 | 4.0 | 5.8 | 5.6 |
| 4 weeks | 3.5 | 6.6 | 4.7 | 3.8 | 5.5 | 5.4 |

[1]Parts by weight
[2]A styrene-polybutadiene teleblock copolymer with a molecular weight of about 150,000 and containing about 60% butadiene.
[3]tackifier

We claim:

1. A water emulsified composition containing 100 phr of a styrene/elastomer block copolymer in which an elastomer midblock comprises 60 to 90% of the copolymer and is isoprene or ethylene-butylene, about 20 to 80 phr of a poly(alpha-methylstyrene) having a softening point between about 200° and 300° F. and about 40 to 900 phr of a butylene polymer comprising 85-98% of mono-olefins.

2. The water emulsified cmposition of claim 1 containing a styrene/isoprene block cpolymer and about 40 to 400 phr of butylene polymer.

3. The water emulsified composition of claim 1 containing a styrene/ethylene-butylene block copolymer and about 100 to 900 phr of butylene polymer.

4. The water emulsified composition of claim 2 containing about 80 to 90 phr of butylene polymer.

5. The water emulsified composition of claim 3 containing about 400 to 600 phr of butylene polymer.

6. A water emulsified sealant composition of claim 2 containing effective amounts of tackifying resins, fillers and surfactants.

7. A water emulsified adhesive composition of claim 2 containing effective amounts of tackifying resins and surfactants.

8. A water emulsified sealant composition of claim 3 containing effective amounts of tackifying resins, fillers and surfactants.

9. A water emulsified adhesive composition of claim 3 containing effective amounts/tackifying resins and suractants.

* * * * *

UNITED STATES PATENT OFFICE
CERTIFICATE OF CORRECTION

Patent No. 4,042,555     Dated August 16, 1977

Inventor(s) Roy A. Fox, Victor V. Raimond & Casey E. Piorkowski

It is certified that error appears in the above-identified patent and that said Letters Patent are hereby corrected as shown below:

In the patent:

Column 2, line 24, "Z-Z" should read --$Z-Z_1$--.

Column 7, line 43, "poystyrene" should read --polystyrene--.

Column 8, line 34, "In water for" should read --In water emulsion for--.

Column 9, line 34, "Reslient" should read --Resilient--.

Column 11, line 27, "slvents" should read --solvents--.

Column 12, line 68, Table VIII, ">5.0 lbs/inch" should read -->5.0 lbs/inch (75% min)--.

Column 13, line 24, "Initially" should read --Initial--.

Column 13, line 44, "them" should read --then--.

UNITED STATES PATENT OFFICE
CERTIFICATE OF CORRECTION

Patent No. 4,042,555          Dated August 16, 1977

Inventor(s) Roy A. Fox, Victor V. Raimond & Casey E. Piorkowski

It is certified that error appears in the above-identified patent and that said Letters Patent are hereby corrected as shown below:

Column 14, line 42, "crumbled" should read --crumbed--.

Column 14, line 45, "entire stirred" should read --entire mixture stirred--.

Column 16, line 40, "cmposition" should read --composition--.

Column 16, line 41, "cpolymer" should read --copolymer--.

Column 16, lines 60 & 61, "suractants" should read --surfactants--.

Signed and Sealed this

Twenty-fourth Day of October 1978

[SEAL]

Attest:

RUTH C. MASON
Attesting Officer

DONALD W. BANNER
Commissioner of Patents and Trademarks